Sept. 18, 1951        G. W. QUERY        2,568,168
RODENT BAITING STATION

Filed June 8, 1949        2 Sheets-Sheet 2

GRADY W. QUERY,
INVENTOR.

ATTORNEY

Patented Sept. 18, 1951

2,568,168

UNITED STATES PATENT OFFICE 2,568,168

RODENT BAITING STATION

Grady W. Query, Charlotte, N. C.

Application June 8, 1949, Serial No. 97,729

4 Claims. (Cl. 43—131)

This invention relates to a baiting station comprising a box in which liquid and powdered forms of poison, such as sodium fluoracetate are stored and which is so arranged as to induce rodents to pass therethrough when it is placed against a wall and the rodents, upon passing therethrough, will come in contact with the poison and this will result in the rodents being killed by the poison.

It is an object of this invention to provide a box which is substantially rectangular in plan and is provided with a removable cover, provision being made whereby the cover may be locked and having means within the box for storing a liquid poison such as sodium fluoracetate. The opposed walls of the box are provided with coinciding openings which are disposed closely adjacent the end of the box which is adapted to be secured to the wall of the building or at the juncture of the wall and the floor of the building and there is provided between the openings an areaway in which a powdered form of poison may be placed so that a rodent passing through the box from one opening to the other will collect the poison on its feet and the rodent will, in some instances, take this powdered poison internally from its paws or feet. Removable means are provided to cause rodents, once they have become accustomed to the baiting station, to enter into an area in which the liquid poison is disposed, the liquid poison having an odor which is inviting to the rodents and thus the rodents will drink the liquid poison which will result in their sudden demise.

Some of the objects of the invention having been stated, other objects will appear as the description proceeds, when taken in connection with the accompanying drawings, in which—

Figure 1 is an isometric view of the baiting station showing the same adjacent a portion of a wall of a building or the like;

Figure 3 is a vertical sectional view taken substantially along the line 3—3 in Figure 2;

Figure 1:
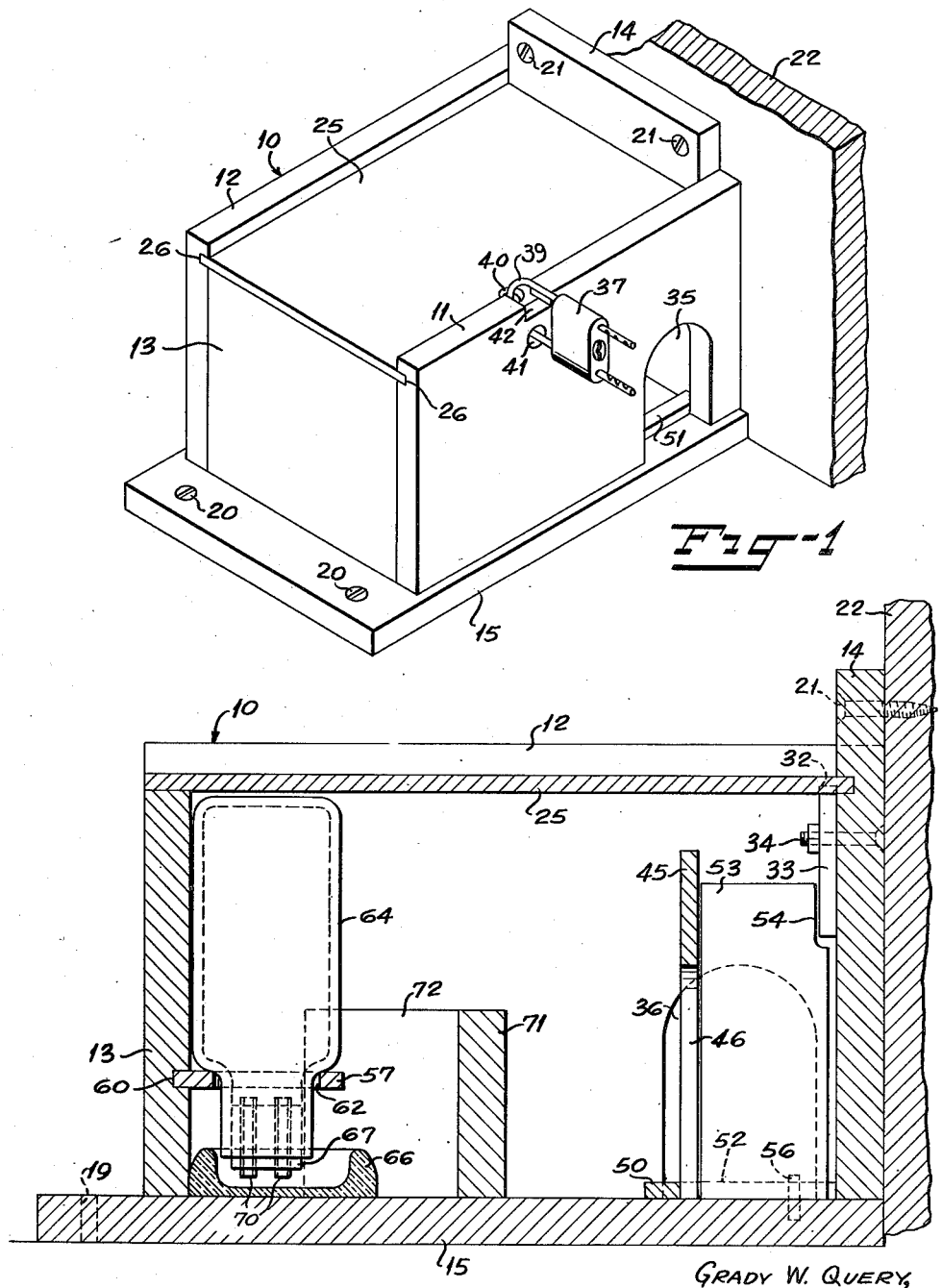

Referring more specifically to the drawings, the numeral 10 broadly designates the baiting station box which may be of any desired material such as wood, metal, or the like and which comprises side walls 11 and 12 and end walls 13 and 14, the lower edges of which rest on a bottom 15. The bottom 15 extends a substantial distance outwardly from the end wall 13 and this portion has holes 19 therein which are preferably slidably penetrated by screws 20 for securing the box 10 to a floor or the like. The rear end wall 14 extends a substantial distance above the upper edges of the side walls 11 and 12 and has suitable holes therein which are also slidably penetrated by screws 21 for securing the same to the wall of a building, the wall being indicated at 22. The upper edge of the front end wall 13 terminates a substantial distance short of the upper edge of the side walls 11 and 12 and a cover member 25 slidably engages the upper edge of the wall 13 and is slidably mounted in suitable grooves 26 in the proximate faces of the side walls 11 and 12 of the box 10.

Figure 4:
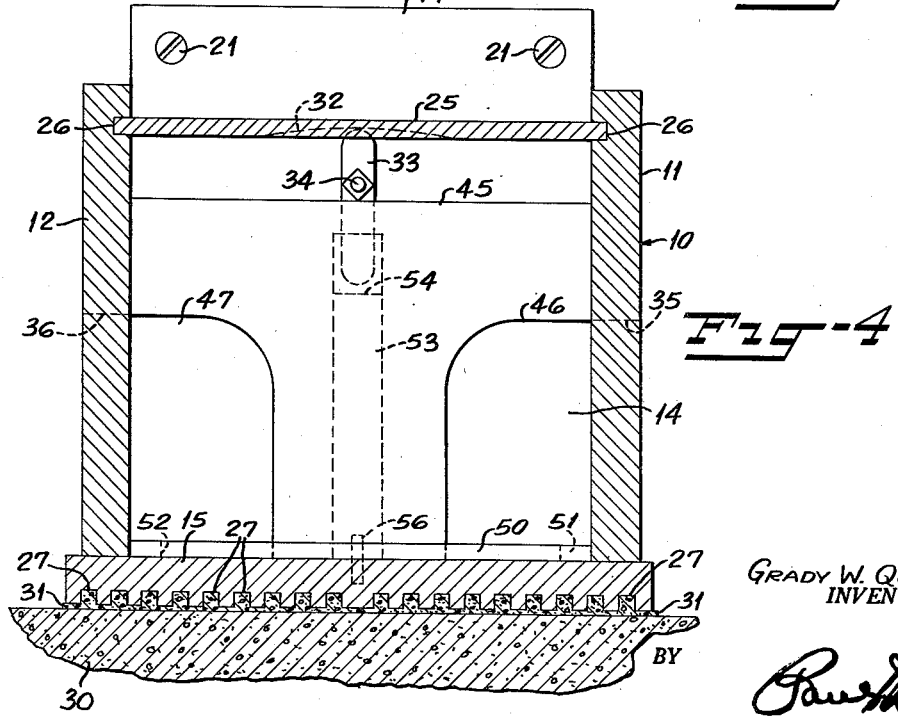
Figure 4 is a vertical sectional view taken along the line 4—4 in Figure 2.

The bottom 15 may preferably be provided with a plurality of longitudinally extending grooves 27 therein so that the box 10 may be placed on a concrete or terra-cotta floor indicated at 30 in Figure 4. In placing the box 10 on the floor 30 a suitable coating or superficial layer of cement 31 may be applied to the area on which the bottom 15 is to rest and it is thus seen that the bottom 15 of the box 10 will adhere to the floor on which it is placed.

The cover 25 is preferably provided with a transverse slot 32 (Figure 4) which is adapted to be engaged by a turn button 33 oscillatably mounted as at 34 on the inner surface of the rear wall 14. The side walls 11 and 12 are provided with openings 35 and 36, respectively, which are preferably of identical configuration and are disposed closely adjacent the inner surface of the rear wall 14 so as to be positioned as close as possible to the wall 22 when the baiting station 10 is being used.

Upon closing the cover member 25, the turn button 33 may be manipulated by an operator reaching through either one of the openings 35 or 36 in the side walls 11 and 12 for locking the cover 25 in closed position. However, in some instances, where the local health authorities require that the cover 25 be locked, a suitable padlock 37 is provided and the cover 25 and the side wall 11 are provided with openings 40 and 41, respectively, through which the locking bar 39 of the padlock 37 is adapted to extend. Also, a notch 42 is provided in the upper edge of the wall member 11 to accommodate the locking bar 39.

A partition 45 spans the distance between the side walls 11 and 12 of the box 10 and is positioned close to the rear wall 14 to thus provide an alleyway therebetween extending from one opening 35 to the other opening 36 and through which rodents, which are unfamiliar with the device will normally pass. This partition 45 may extend all the way from the bottom 13 to the cover 25, though, in this instance, the partition 45 terminates a substantial distance below the cover 25.

The partition 45 is provided with a pair of openings 46 and 47 which are disposed immediately adjacent the openings 35 and 36 in the walls 11 and 12 for purposes to be later described. A shallow transverse member 50 is secured to the bottom 15, preferably by gluing, and extends between the walls 11 and 12. Short members 51 and 52 of the same height at the member 50 extend rearwardly from opposed ends thereof and their rear ends engage the wall 14. The members 50 to 52, inclusive, and the wall 14 thus define an area in which a powdered poison may be disposed and which will collect on the feet of an animal passing through the alleyway defined by the partition 45 and the rear wall 14.

Figure 2:
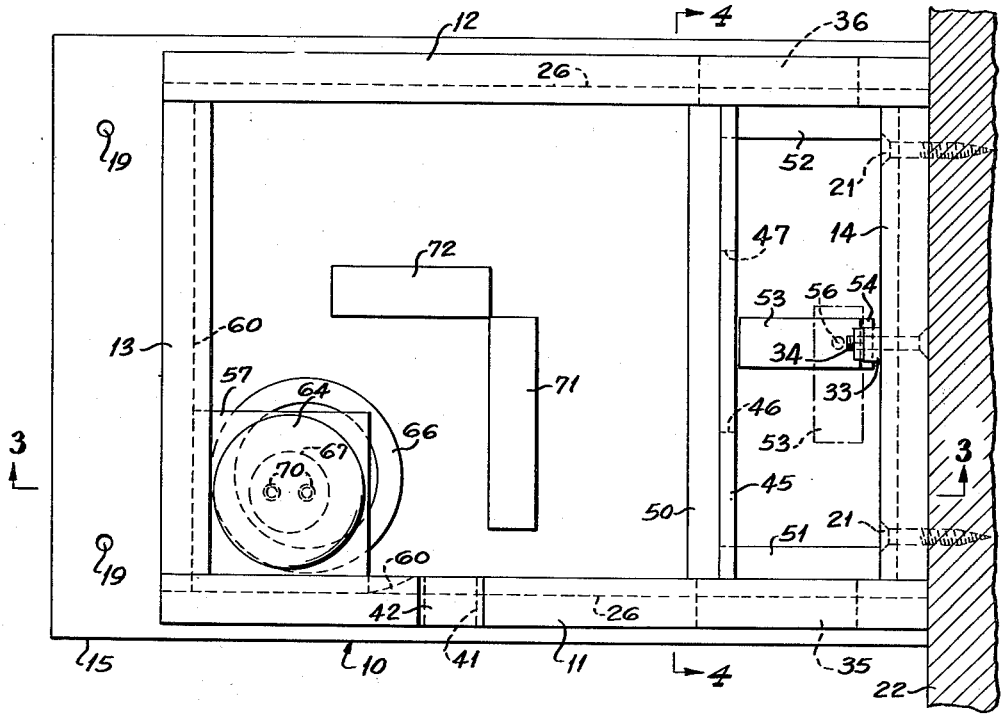
Figure 2 is an enlarged top plan view of the baiting station with the removable cover omitted.

After the rodents have become familiar with the baiting station 10 by passing through the said alleyway, a removable partition 53 may be inserted in the solid line position shown in Figure 2 between the partition 45 and the rear end wall 14 and this will induce the rodents to pass through the openings 46 and 47 in the partition 45 after entering the box 10 through one of the openings 35 and 36. The removable partition 53 has a notch 54 in its upper right-hand corner in Figure 3, to thus clear the turn button 33. The lower end of the partition 53 is provided with a pin 56 which projects downwardly and is adapted to be loosely mounted in a vertical bore in the bottom 15 of the box 10 and, if desired, instead of removing the partition 53 from the box 10, the partition 53 may be swung on its pin 56 to the dotted line position shown in Figure 2, depending of course on the size of the rodents which are to pass through the box or baiting station 10.

In Figures 2 and 3 there is shown a substantially rectangular plate 57, which may be secured to the walls 13 and 11 in any suitable manner and in this instance the walls 11 and 13 are provided with suitable grooves 60 in which the edges of the rectangular plate 57 are secured as by gluing.

The plate 57 is positioned a predetermined distance above the top surface of the bottom 15 and has an opening 62 therein in which the neck of a bottle or jar 64 may be inserted in inverted position. This bottle or jar 64 is adapted to contain a very potent liquid poison such as sodium fluoracetate which is usually only available to licensed exterminators and which, when used, must be placed within a closed locked container, such as the present baiting station 10, and also out of reach of anyone's hands extending through the openings 35 or 36 for obvious safety purposes.

Resting on the top surface of the bottom 15 and disposed below the jar 64 is an open topped container or drinking station, preferably of glass as indicated at 66. The bottle or jar 64 is of such length that its upper end in Figure 3 is disposed closely adjacent the lower surface of the cover 25 and the lower end of its neck portion will extend into the cup-shaped container 62 to thus prevent the container 66 from being pulled away from a position below the lower end of the jar 64 by a rodent drinking from the same. The lower end of the jar 64 is provided with a cap or stopper 67 which is penetrated by a pair of tubular members 70 and thus the poisonous liquid is free to escape from the jar 64 into the container 66 until the level of the liquid rises above the opened lower ends of the tubular members 70 thereby causing a seal for the bottle or jar 64 until the level of the liquid drops below the bottle neck, as by evaporation, or as it is consumed by the rodents.

The particular type of liquid poison used in the jar 64 has an odor pleasing to rodents and, consequently, once the rodent has passed through the openings 46 or 47 in the partition 45 they will tend to search out the container 66 and partake of the contents therein.

In order to prevent anyone from reaching through the opening 35 or 36 in the side walls 11 and 12 and accidentally coming in contact with the poisonous liquid from the jar 64, a pair of transverse partitions 71 and 72 are disposed between the openings 35 and 36 and the bottle or jar 64. The outer ends of these partitions 71 and 72 are spaced a substantial distance from the walls 11 and 13, respectively, and their upper ends terminate a substantial distance from the lower surface of the cover 25 so the odor from the contents of the bottle 64 may permeate the entire area defined by the box 10 and to also permit access to the container 66 by the rodents. The upper edges of the partitions 71 and 72 are disposed high enough so a person's hand may not reach above the upper edges of the same when extended through the openings 35 and 46 or 36 and 47.

One of the most important features of the present baiting station is the provision of the openings 35 and 36 in opposed walls of the baiting station in such a manner as to be closely adjacent the wall of a building when the baiting station is in use, and since rodents usually travel along the walls of a building, feeling their way along with their noses, they will instinctively pass through the openings rather than try to jump over the baiting station or pass around the same, and which will obviously prove more efficient in exterminating rodents than any apparatus heretofore available.

Due to the potency of the liquid poison in the jar 64, the junction points of the walls 11, 12 and 13 and the member 50 with the bottom 15 may be coated with a suitable waterproofing material, or the walls 11, 12, 13 and member 50 may be joined to the bottom 15 with a waterproofing adhesive material, to thus prevent the contents of the jar 64 from leaking out of the box 10 in the event the jar is broken or the contents therein accidentally overflow the station 16.

In the drawings and specification there has been set forth a preferred embodiment of the invention, and although specific terms are employed, they are used in a generic and descriptive sense only, and not for purposes of limitation, the scope of the invention being defined in the claims.

I claim:

1. A baiting station box comprising a bottom, opposed side walls and front and rear walls and a removable cover, each of the opposed side walls having an opening therein extending from the said bottom and said openings being disposed in substantial alinement with each other and closely adjacent the said rear wall, a partition extending between said opposed walls and having openings therein disposed closely adjacent the openings in the opposed walls, means on the inner surface of the rear wall and accessible only through said openings in the opposed walls for locking the cover in a closed position, whereby the said rear wall and the bottom may be placed at the juncture of the floor and wall of a building and a suitable powdered poison may be placed on the top surface of the bottom and rodents passing along said wall will instinctively pass through the opening in the opposed walls of the box collecting the poison on their feet as they pass through the box, the bottom projecting out beyond one of the end walls and the other end wall projecting above the upper edges of the side walls and having holes therethrough for securing the same to a floor and a wall of a building.

2. In a structure according to claim 1, means for storing a liquid poison in the box adjacent the front wall thereof and remotely from the rear wall thereof to where it will be inaccessible to human hands but will be accessible to a rodent upon the rodent passing through either of the openings in the opposed walls and through the corresponding openings in the partition extending between the opposed walls.

3. In a structure according to claim 2, a removable partition extending between the said partition and the rear wall to thus induce the rodent to pass through either of said openings in the opposed walls and then through either of the corresponding openings in the partition to where they will be in closer proximity to the liquid poison stored adjacent the front wall of the box.

4. A rodent baiting station comprising a closed rectangular box having a transverse partition therein, opposed walls of said box having coinciding openings therein disposed immediately adjacent one end of said box, means disposed adjacent the end of said box remote from said openings for supporting a liquid poison container, said partition being disposed closely adjacent said openings in the opposed walls and said partition having openings therein closely adjacent said openings in the opposed walls, means for storing a powdered poison between the said openings in the opposed walls whereby rodents passing through the openings in the box will collect the powdered poison on their feet, a removable partition blocking the passageway between said openings in opposed walls, whereby rodents, upon being familiarized with the baiting station, will pass through the adjacent openings in the partition and into the area in which the liquid poison is stored and may partake of the same.

GRADY W. QUERY.

REFERENCES CITED

The following references are of record in the file of this patent:

UNITED STATES PATENTS

| Number | Name | Date |
|---|---|---|
| 1,194,432 | Sigler | Aug. 15, 1916 |
| 1,228,170 | Beleal | May 29, 1917 |
| 1,268,439 | Dodge | June 4, 1918 |
| 1,321,360 | Bright | Nov. 11, 1919 |
| 1,677,544 | Brainard | July 18, 1928 |
| 2,291,358 | Treadwell | July 28, 1942 |

FOREIGN PATENTS

| Number | Country | Date |
|---|---|---|
| 239,889 | Switzerland | Mar. 1, 1946 |
| 411,996 | Germany | Apr. 14, 1925 |